(No Model.) 2 Sheets—Sheet 1.
G. W. KRAMER.
STEERING GEAR FOR TRACTION ENGINES.
No. 503,147. Patented Aug. 15, 1893.
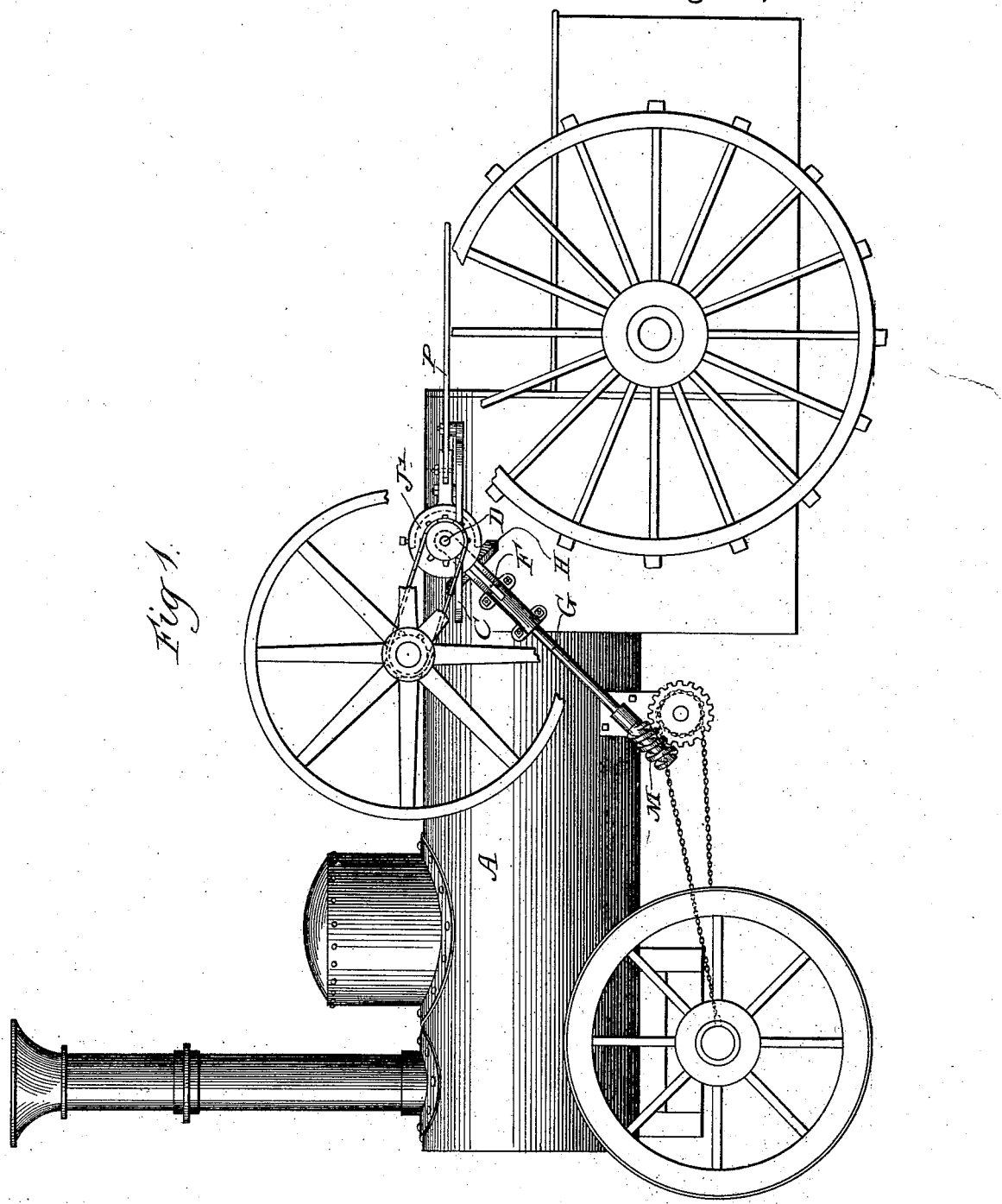
Witnesses.
Inventor
George W. Kramer
By Kerr & Kerr
his Att'ys (No Model.) 2 Sheets—Sheet 2.
G. W. KRAMER.
STEERING GEAR FOR TRACTION ENGINES.
No. 503,147. Patented Aug. 15, 1893.
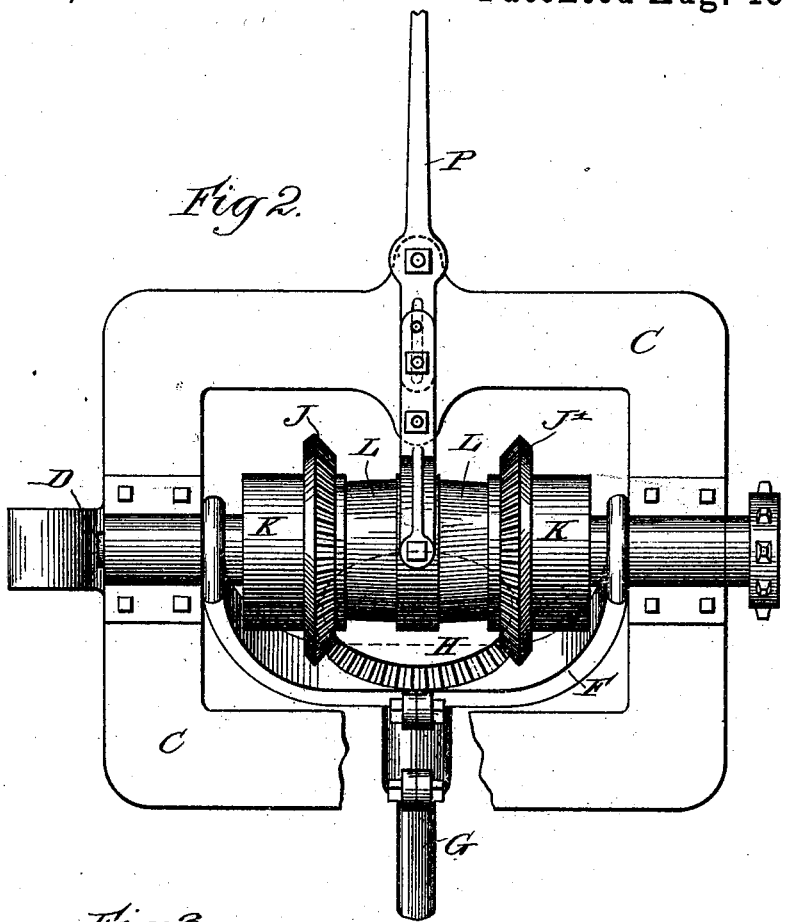
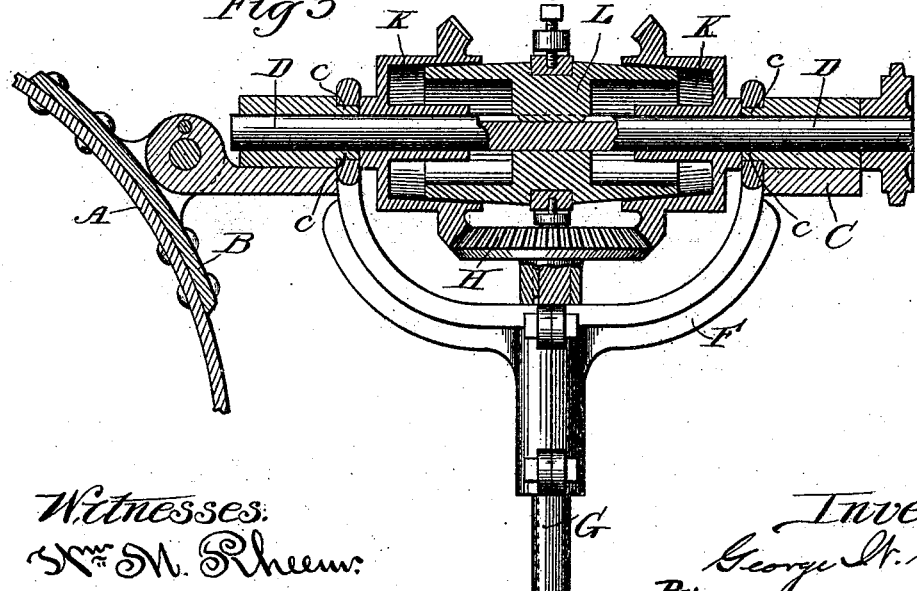

UNITED STATES PATENT OFFICE.

GEORGE W. KRAMER, OF PEORIA, ILLINOIS, ASSIGNOR TO THE HART WEIGHER COMPANY, OF SAME PLACE.

STEERING-GEAR FOR TRACTION-ENGINES.

SPECIFICATION forming part of Letters Patent No. 503,147, dated August 15, 1893.

Application filed May 1, 1893. Serial No. 472,517. (No model.)

*To all whom it may concern:*

Be it known that I, GEORGE W. KRAMER, a citizen of the United States of America, residing at Peoria, county of Peoria, and State of Illinois, have invented certain new and useful Improvements in Steering-Gear for Traction-Engines, of which the following is a specification.

Referring to the accompanying drawings, wherein like reference letters indicate like or corresponding parts:—Figure 1, is a view of a traction engine equipped with my improvements. Fig. 2, is a top plan of my improved steering device with parts broken away to show the connecting yoke, and Fig. 3, is a partial sectional view of the same.

This invention is in the nature of an improvement upon an invention for which I have heretofore made application for Letters Patent, said application being filed in the United States Patent Office, April 7, 1892, and bearing Serial No. 428,242; and consists, first, in an improved means for the adjustment of the rod extending from the take-up drum to the steering device, to the various angles of inclination at which it would be set upon different engines, and second, in the improved means for connecting said rod to the driving mechanism of the steering device.

In the drawings A, represents the boiler of a traction engine; B, a bracket adapted to be secured to the boiler, and having one or more ears to which the supporting frame C is secured. On the frame C, is journaled the shaft D. Loosely mounted on the shaft and facing each other are two beveled pinions J J', each of which is provided on its inner face with an annular flange, K. Between these pinions and mounted on the said shaft and revolved therewith is a friction bowl L, adapted to be moved longitudinally to clutch with and actuate the pinion on either side with which it may be brought in contact. A collar surrounds the bowl at its center and from this collar a lever extends to within reach of the operator so that he may shift the bowl one way or the other at will. The shaft is connected with and driven by the driving mechanism of the engine in any satisfactory way, as by means of a sprocket-chain, upon the sprocket-wheel E, and upon a similar part of the engine, (see Fig. 1.) All of the above has been fully explained in my prior application referred to and needs no further mention here.

Upon the inner ends of the journals carrying the shaft D, and in line with the shaft D, are formed two bosses c c, while pivotally depending from said bosses is the yoke F, carrying the intermediate pinion H, which is at all times in mesh with, and adapted to be driven by, one or the other of the pinions J J', (see Figs. 2 and 3.) Extending through said yoke, perpendicular to the shaft D, is a shaft G, the inner end of which is secured to the bevel-pinion H. The shaft G, extends downward and terminates in a worm screw M, which meshes with and operates a gear wheel upon the take-up drum, which in turn is connected to and operates the front axle of the engine in the usual way. It will thus be seen that the yoke F carrying the pinion H, is capable of a movement forward or backward in the arc of a circle of which the shaft D is the center. Consequently the pinion H, is at all times in equal mesh with the pinions J J' no matter at what angle of inclination the shaft G stands. This is important, as my invention is an attachment adapted to be placed on different makes of traction engines, and consequently to be placed on different parts of the engine, thus the shaft G may stand at one angle of inclination upon one engine and at a different angle upon another engine. It is obvious that this invention is equally adapted for this purpose, whether the clutch revolves continuously and the pinions intermittently as herein shown, or whether the pinions revolve continuously and the clutch-bowl intermittently, hence I do not wish to be understood as limiting my invention to the exact form of device here shown. It will also be seen that as the shaft G is revolved, the worm-screw upon its end causes a slight longitudinal pulling or pushing action upon such shaft according to whether the shaft is revolved to the right or to the left. This causes the pinion H to vary in its contact with the pinions J J', at one time being pulled slightly outward, and at another being pushed inward, thereby causing unequal contact and wear, and unequal force to drive it. To overcome this, I prefer to spline or feather the shaft G into the hub of the pinion H, (see Fig. 3) this allows the slight longitudinal movement mentioned to take place without varying the contact of the pinions. It is obvious that a squared or irregular end on the shaft may fit into a similarly shaped opening in the pinion, to secure the same end, without departing from the spirit of my invention.

The mode of operation is as follows:—The shaft D is caused to revolve by means of its connection with the engine. The operator by means of the lever moves the bowl to the right or left causing it to come in contact with and revolve one of the pinions J J', which acting at opposite sides upon the periphery of the pinion H, revolve it to either the right or the left, according to whether the pinion J or J' actuates it. A like action is imparted to the shaft G and screw-thread M, and the take-up drum, thus steering the engine to the right or to the left as desired. When it is not desired to change the course of the engine, the bowl L is held in the center, by means of the lever between the pinions J J', but not in contact with either one. The pinions and connecting mechanism are thus at rest, and the engine allowed to follow its course

Having thus described my invention, what I claim as new, and desire to secure by Letters Patent, is—

1. In a device of the kind described, a frame supported by the boiler; a shaft carried thereby; two oppositely disposed beveled pinions mounted upon said shaft; and a clutch also mounted upon the shaft adapted to be moved longitudinally to co-act with said beveled pinions; in combination with a pivoted yoke adapted to move in the arc of a circle whose center is the shaft; an intermediate beveled pinion supported by the yoke in such a manner as at all times to be in mesh with both of the other pinions; a shaft extending through the yoke and so connected to the intermediate pinion as to revolve therewith; a take-up drum adapted to control the front wheels of the engine, and means for connecting the rotary driven member with the take-up drum; substantially as described.

2. In a device of the kind described, the frame C; the shaft D carried thereby; the pinions J J' loosely mounted on the shaft; the clutch L, feathered on said shaft and adapted to move longitudinally thereon to operate either of the pinions J J'; in combination with the swinging yoke F, adapted to move in the arc of a circle whose center is the shaft; the intermediate pinion H; the shaft G actuated by the pinion H; and means for imparting the rotary motion of the shaft G to the take-up drum; substantially as described.

3. In a device of the kind described, the frame C; the shaft D; the beveled pinions J J' loosely mounted thereon; the clutch L, feathered upon said shaft and adapted to move longitudinally to operate either of said pinions; in combination with the swing yoke F, mounted on the bosses $cc$ and carrying the pinion H; the shaft G operated by the pinion H; and a worm-screw upon the shaft G by means of which the take-up drum is operated; substantially as described.

4. In a device of the kind described, the frame C; shaft D; pinions J J'; clutch L, and intermediate pinion H, properly supported so as to mesh with both the pinions J J'; in combination with the shaft G, connected to the intermediate pinion in such a manner as to revolve therewith and also permit of a slight longitudinal movement; and means for imparting the rotary motion of said shaft to the take-up drum; substantially as described.

5. In a device of the kind described, the frame C; shaft D; pinions J J'; clutch L; yoke F, and intermediate pinion H, in combination with the shaft G, feathered in the pinion H; a worm-screw upon said shaft, and the take-up drum operated by said worm-screw; substantially as described.

GEORGE W. KRAMER.

Attest:
D. S. LEE,
W. C. HANNA.